United States Patent

[11] 3,629,956

| [72] | Inventors | Lucius Ponder Thomas;<br>James Alexander McDonald; Eugene Ernst Janson; Todd J. Christopher; John Charles Peer, all of Indianapolis, Ind. |
|---|---|---|
| [21] | Appl. No. | 60,866 |
| [22] | Filed | Aug. 4, 1970 |
| [45] | Patented | Dec. 28, 1971 |
| [73] | Assignee | RCA Corporation |

[54] TEACHING AND GAME PLAYING MACHINE
4 Claims, 4 Drawing Figs.

| [52] | U.S. Cl. | 35/9 A |
|---|---|---|
| [51] | Int. Cl. | G09b 7/08 |
| [50] | Field of Search | 35/9 A; 273/1 E |

[56] References Cited
UNITED STATES PATENTS

| 3,103,073 | 9/1963 | Nickl et al. | 35/9 A |
| 3,355,819 | 12/1967 | Hannah et al. | 35/9 A |
| 3,584,396 | 6/1971 | Hannah et al. | 35/9 A |
| 3,584,398 | 6/1971 | Meyer et al. | 35/9 A X |

*Primary Examiner*—Wm. H. Grieb
*Attorney*—H. Christoffersen

ABSTRACT: Frames on a film may contain multiple choice questions which can be answered by selecting one of a number of answer buttons but each frame includes only a single next address code. The latter has only a small number of bits but is ambiguous in the sense that the present address on a number of frames is equal to this next address. The ambiguity is resolved by counting the frames having this common present address until the one called for by the selected answer button is reached. A second feature of the machine useful in playing games is the production of a random number in response to a user actuated button for comparison with the count of frames having a particular common present address.

PATENTED DEC 28 1971

BY
*Samuel Cohen*
Attorney

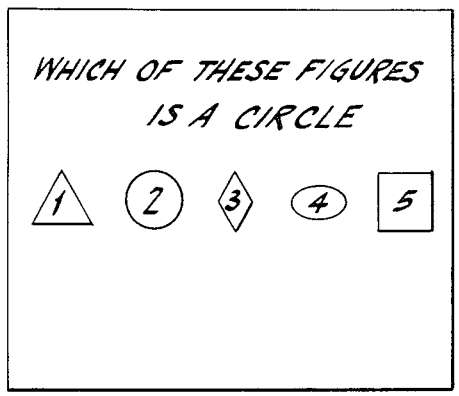
(a)
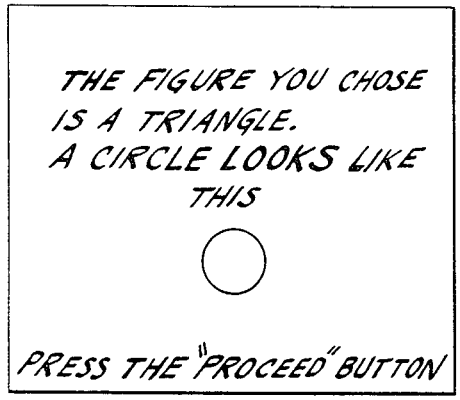
(b)
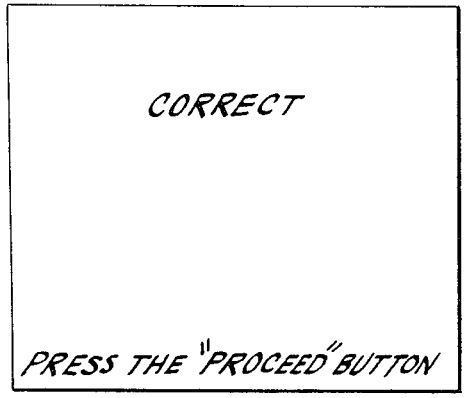
(c)
Fig. 3.
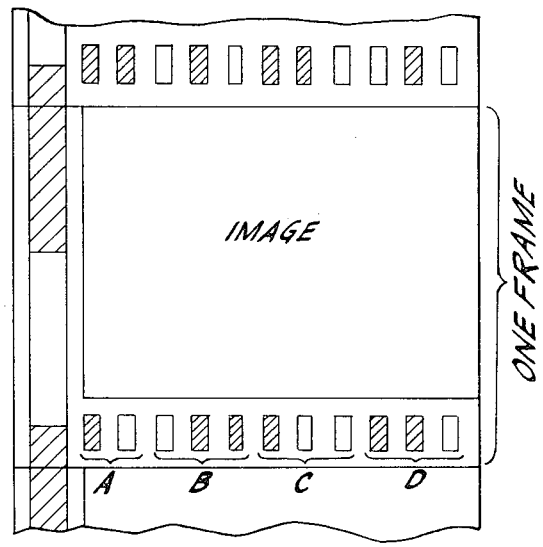
Fig. 2.

TEACHING AND GAME PLAYING MACHINE

BACKGROUND OF THE INVENTION

There are known in the art numerous forms of self-contained teaching and game playing machines which employ a moving picture or similar projector for the presentation of instructional or other material. One class of such machines, exemplified by Nickel et al., U.S. Pat. No. 3,103,073 includes in each frame instructional material and multiple choice answers. The answers are numbered and the student chooses one by depressing a corresponding number on a keyboard. In response to the depression of a key such as "5," a control circuit moves the film a predetermined number of frames in a given direction as, for example, five frames in the forward direction. While this system is advantageous in that next address control coding is not needed on the film itself, the programming of the film can be difficult, especially where there may be many different learning branches. The reason is that the answer frames must be placed immediately adjacent to the question frames.

In another class of machines as exemplified by Hannah et al., U.S. Pat. No. 3,355,819, the frames are separated by spaces which contain control information. In response to a question on a frame, the student depresses one of a number of answer buttons. The logic circuits of the system read from the film a particular one of a plurality of unique next addresses, depending upon which one of the pushbuttons is depressed. For example, if pushbutton A is depressed, the address code on say the third row from the bottom of the film (FIG. 3) may be read, and if a different pushbutton is depressed, the address code on a different row on the film may be read.

The system above is advantageous as the programmer can place the answer frames anywhere desired along the length of the film. However, the disadvantage of the system is that a relatively large amount of space is required on the film for control information.

The object of the present invention is to provide an improved teaching and game playing machine which requires a relatively small amount of control data on the film itself and yet, which is quite versatile and easily programmable.

SUMMARY OF THE INVENTION

In the machine of a preferred embodiment of the present invention, the control code on each frame representing the next address requires only a small number of bits, but is ambiguous in the sense that there may be a number of frames whose present address is equal to this code. The ambiguity is resolved by choosing the one of these frames called for by the particular answer button the user chooses. The machine also has the capability of operating in a random mode. Here, the next address code is modified by a randomly produced number in response to a user actuated button.

BRIEF DESCRIPTION OF THE DRAWING

FIG. 2 shows a portion of the film strip employed in the FIG. 1;

FIGS. 3a, 3b, and 3c illustrate portions of different frames of a simple lesson.

DETAILED DESCRIPTION

Figure 1:
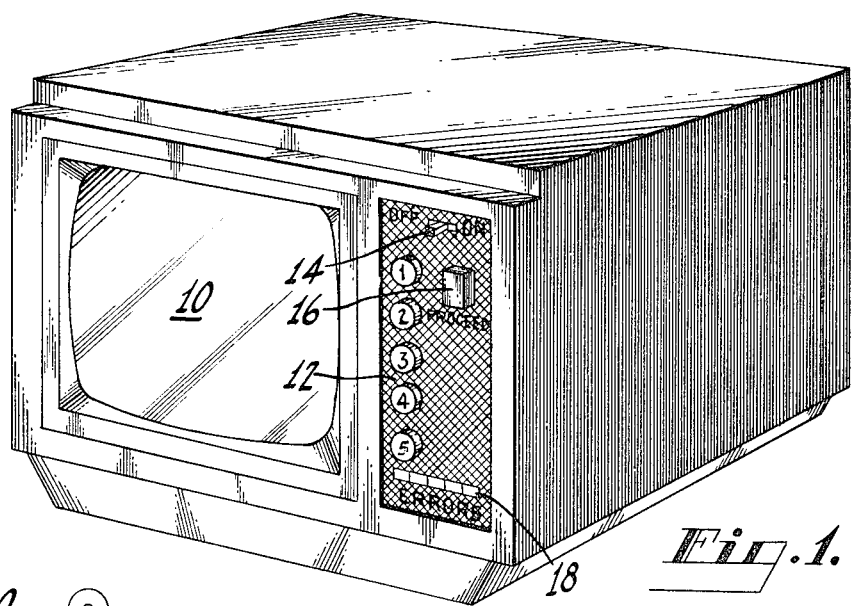
FIG. 1 shows the chassis of an embodiment of the teaching machine according to the invention.

The chassis shown in FIG. 1 includes a viewing screen 10 and a panel 12 containing the controls for the machine. The panel includes an on-off switch 14, five answer buttons legended 1 through 5, and proceed button 16. The panel also includes an error indicator 18 which may consist of a group of lamps or the like. As the latter is not of interest in the present application, it is not discussed further.

To operate the system of FIG. 1, it is necessary only to turn the switch 14 to the "on" position, and then to follow the instructions which appear on the screen. For example, FIG. 3a shows a typical frame as would be viewed by a user. The numerals 1 through 5 within the geometric shapes which are illustrated refer to the answer buttons. If the student should depress answer button 1, the film will be moved until the frame shown in FIG. 3b appears. This indicates to the student that he has made a wrong choice, that he has chosen a triangle rather than a circle. The frame also indicates that the proceed button should be depressed. When this is done, the programming on the film may be such that it returns to the frame of FIG. 3a or, if desired, the film may be moved to a different learning branch.

If, in response to the question posed in the frame shown in FIG. 3a, the student depresses answer button 2, the frame shown in FIG. 3c will appear. This frame indicates that the answer which has been chosen is correct and also instructs the student to press the proceed button.

FIG. 2 shows a frame of the film. It includes an image portion which occupies the major part of the frame and it includes also control data extending across the lower and the left edges of the frame. The control data at the left edge of the frame is for purposes of centering and as this is not of direct interest in the present application, it is not discussed further. The control data at the lower edge of the frame consists of 11 areas, each of which may be transparent or opaque. A transparent area represents a binary digit (bit) of one value such as a 1 and an opaque area represents a bit of another value such as a 0. The 11 bits are subdivided into four subgroups, a two-bit A word and three-bit B, C, and D words.

The values of the bits in the various groups together with the particular button depressed by the user, control the operation of the machine. Only certain of the control functions, those of interest in the present application, are discussed here.

The A bits indicate whether the film is to move forward or backward and also have other functions as discussed shortly. The B bits are the next address code. For example, if the B bits are 011=3, this indicates that the film is to be moved to a frame whose present address is 3. Depending upon a number of factors, some of which are discussed below, this coding may mean to move to the first occurring frame in say the forward direction whose present address is 3 or it may mean to move to the second, or third or–$n$'th frame in the forward (or the reverse) direction whose present address is 3. The three C bits indicate the address of the frame in view (the "present address"). The three D bits include other information as discussed in more detail shortly.

The coding on five different frames is discussed below to illustrate some of the possibilities and to explain in somewhat more detail the meaning of certain of the codes.

|   | $A_1$ | $A_2$ | $B_1$ | $B_2$ | $B_3$ | $C_1$ | $C_2$ | $C_3$ | $D_1$ | $D_2$ | $D_3$ |
|---|---|---|---|---|---|---|---|---|---|---|---|
| 1 | 1 | 1 | 0 | 0 | 0 | 1 | 0 | 1 | 0 | 0 | 1 |
| 2 | 0 | 1 | 1 | 1 | 1 | 0 | 0 | 0 | 1 | 1 | 1 |
| 3 | 0 | 0 | 0 | 1 | 1 | 0 | 0 | 0 | 1 | 1 | 0 |
| 4 | 0 | 0 | 0 | 1 | 1 | 0 | 0 | 1 | 0 | 1 | 1 |
| 5 | 1 | 1 | 1 | 0 | 1 | 1 | 1 | 0 | 0 | 0 | 1 |
|   |   |   |   | 0 |   |   |   |   |   | 1 | 1 |
| 5 | 1 | 1 | 1 | 0 | 1 | 1 | 1 | 0 | 0 | 0 | 1 |

In row 1 above, the A bits 11 indicate that the film is to be moved forward to the first frame whose next address B is 000, in response to the depression of the proceed button. The present address of the frame of row 1 is 101=5. The D code may be disregarded for the present.

In row 2 of the table, the A bits 01 indicate that in response to the depression of the proceed button, the film is to be moved backward and is to stop at the first frame whose present address B is 111=7. The present address C of the frame in row 2 is 000. The three D bits 111 indicate that certain counters in the system are to be cleared.

In row 3, the A bits 00 indicate that the machine is in a "question mode." In this mode, the direction the film is to be moved in response to the depression in an answer button is that specified by bit $D_3$. The 0 present there indicates that the film is to be moved forward. The bits $D_1 D_2=11$ indicate that the user will be permitted to actuate only answer buttons 1 and 2 and that answer buttons 3, 4, and 5 will be locked in position. The next address is 011 and the address of the frame in view is 000. If in response to a question on the frame in view the student depresses pushbutton 2, the film will be moved forward a distance such that the second frame having the present address 011 will come into view. The way in which this is done is discussed shortly in connection with FIG. 4.

Row 4 of the table indicates that the machine is in the question mode and bit $D_3$, which has the value 1, indicates that in response to the depression of an answer button, the film is to be driven in the backward direction. The bits $D_1 D_2=01$ indicate that the student will be permitted to choose only answer button 1 or 2 or 3 and that answer buttons 4 and 5 will be locked. The next address is 011=3 and the present address is 001.

In row 5, the A code bits 11 and the D code bits 001 indicate a "random mode" of machine operation. In this mode, when $A_1 A_2=11$, as shown, the machine is placed in the forward, random next address mode. Here, when the proceed button is depressed, the film will be driven forward a random number of frames (say from 1–8) to the next address B indicated. For example, in response to the depression of the proceed button, the number 4 may be randomly generated. In response to this number, the film will be driven forward to the fourth frame whose present address is 101. (There is also a backward, random next address mode indicated by the value of the A bits and D bits).

Figure 4:
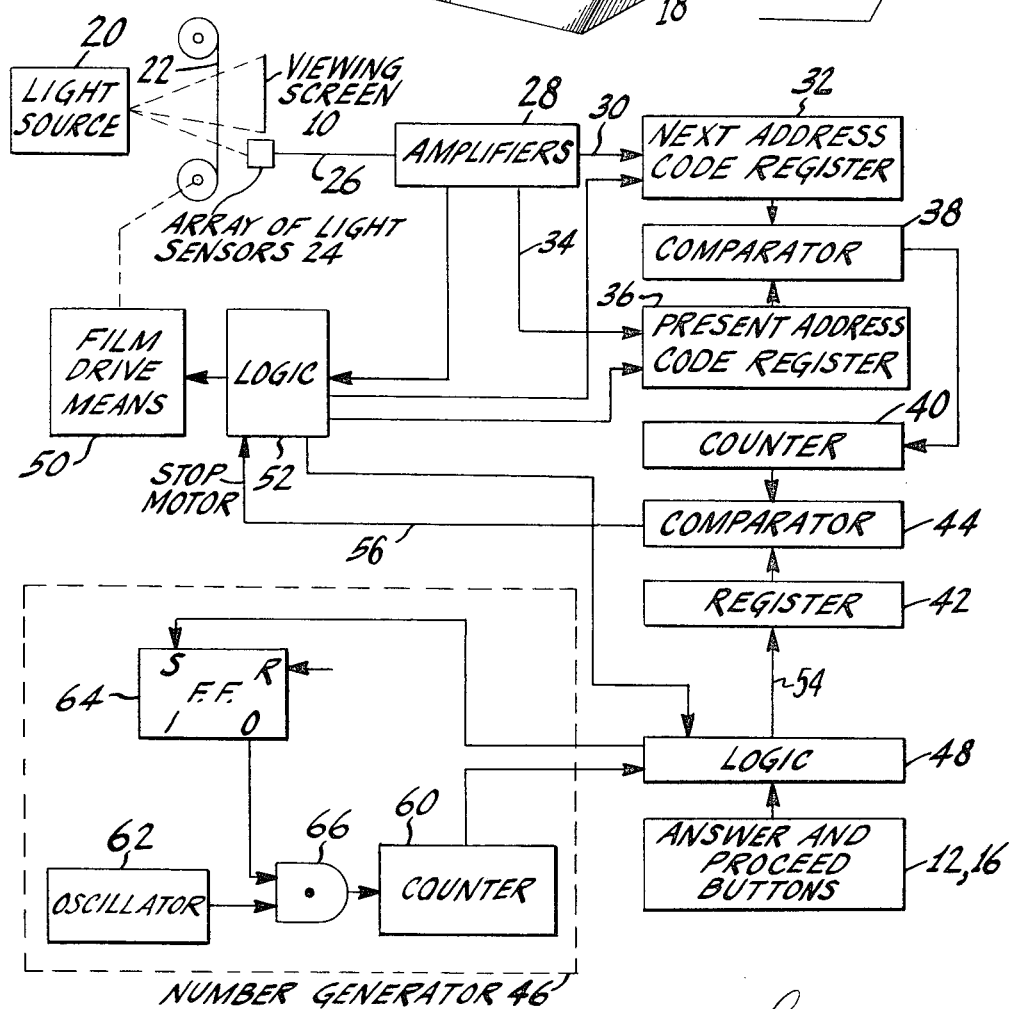
FIG. 4 is a block diagram of the portion of the machine of FIG. 1 of interest in the present invention.

The portion of the system discussed above of interest in the present application is illustrated in block form in FIG. 4. It includes a light source 20 which illuminates both the picture information and the control data on the film 22. The picture information is projected onto the viewing screen 10 and the control information, which is not visible on the screen, is projected onto an array of light sensors 24 such as phototransistors or the like. The electrical signals produced in response to the light received by the sensors 24 is applied via cable 26 to a group of amplifiers 28. The multiple conductors of cable 26 are illustrated as a single line for purposes of drawing simplicity. Tee same practice is followed in the remainder of the drawing.

The three electrical signals representing the next address B are applied via a three conductor cable 30 to the next address register 32. The present address sensed by the sensors is converted into electrical signals and the three electrical signals representing the present address are applied via cable 34 to the present address code register 36.

The comparator 38 compares the numbers stored in the two registers 32 and 36 and when they are equal it produces an output which it applies to counter 40. The contents of the counted 40 are compared with the contents of register 42 by a comparator 44. The register 42 is loaded either in response to a particular answer button in panel 12 which is depressed or by a number produced in the number generator 46, as discussed shortly. The logic stages at 48 perform a number of functions including that of applying the number produced at 12 or the number produced at 46 to the register 42.

The film is driven by the film drive means 50, which may include a motor or the like, under control of the logic stages 52. These cause suitable drive voltages to be applied to the drive means for driving the film in the forward or the backward direction and for stopping the film at the frame called for by the control data on the film and the information supplied from 12 or 46.

In the operation of the system of FIG. 4, assume that a frame is in view the A bits of which are 00, that is, assume that the machine is the question mode. Assume also that the next address code B is 110=6 and that the D code indicates that any one of the five answer buttons may be depressed. The number 6 is stored in the next address code register 32. Upon depression of the answer button, say answer button 3, the logic stages 52 apply a drive signal to the film drive means 50 to drive it in the direction indicated by the $D_3$ bit. Assume that $D_3=0$ so that the motor drives the film in the forward direction.

During the movement of the film 22, the light source 20 continues to illuminate the control codes A, B, C and D. In practice, the viewing screen is blanked by placing a shutter in front of the part of the light directed at the viewing screen, however, as this is not part of the present invention, it is not illustrated.

Each time the amplifier 28 receives a present address code, it applies that code to the present address code register 36. This may be done, for example, by applying a priming signal from the logic stages 52 to the input gates to the present address code register 36 each time the code portion of a frame reaches the light sensors 24.

Each time there is a match between the present address code stored in register 36 and a next address code previously stored in register 32, the comparator 38 produces an output signal and advances the count stored in counter 40 by 1.

Assume now, as already mentioned, that the user has depressed the answer button 3. The logic stages 48 translate the depression of this button to binary 3 (011) and applies these three bits, via cable 54, to the register 42. When the counter 40 also has been advanced to the count of 3, the comparator 44 produces an output at lead 56 which causes the logic stages 52 to stop the film drive means 50. It may do this, for example, by shorting one of the windings of the motor or in any one of a number of other ways. In addition, a servosystem within block 50 may be employed to center the frame by matching the alignment code at the left edge of the film with a mark (not shown) in a manner which in itself is known and not part of the present invention.

Summarizing the above, in response to the next address code B=6 and the depression of the answer button 3, the following events occur. The next address code 6 is transferred to the next address code register 32. The film is driven in the direction indicated by code D (the forward direction in the present instance). The first frame sensed by the sensors 24 with the address 6 causes the count in counter 40 to advance by 1. Note that this next frame can be any number of frames away from the frame containing the question to which the user has responded. The second time the present address 6 appears on a frame, the counter 40 advances to the count of 2 and the third time the present address 6 occurs, the counter 40 advances to 3. The depression of answer button 3 has stored a 3 in the register 42. Thus, when the third frame having an address code of 6 thereon is sensed, the comparator 44 applies a stop motor signal, via logic stages 52, to the drive means 50 and the latter stops and centers this frame on the viewing screen.

Assume now that a game is being played, that the machine is in its random mode, that is, the A bits are 11 and the D bits are 001, and that the instruction on the frame is to depress the proceed button. In this particular game, it is as if a dice is to be thrown and some random number is to be generated (D code bits are 001) of some value 1 through $n$, where $n$ depends upon the number of stages in counter 60.

In operation, the oscillator 62 continuously oscillates and produces pulses. The oscillator may be stable or unstable. The flip-flop 64 normally is reset and primes AND-gate 66. Therefore, the pulses produced by oscillator 62 normally are applied through AND-gate 66 to the counter 60 and the latter continually counts through $n$ counts. If counter 60, for example, is a three stage counter, it continually counts from 000 through 111.

Normally, the logic stages 48 do not connect the counter to the register 42. However, when in the random number mode, the logic stages 52, in response to the A and D codes on the film, apply an appropriate group of binary signals to the logic stages 48 for causing the counter 60 to apply its bits to a corresponding number of normally disabled input gates to register 42. In response to the depression of the proceed button on panel 12, the logic stages 48 apply a set pulse to flip-flop 64 disabling AND-gate 66. The time at which the set pulse occurs is dependent on the time that the proceed button is depressed and has no relationship to the number stored in the counter 60 at that time. Thus, it may be that AND-gate 66 becomes disabled when counter 60 is storing say a 4 or any other number. A short time after the AND gate is disabled, the logic stages 48 apply a priming signal to the gates within block 48 between the counter 60 and the register 42 so that the number in the counter 60 is applied to the register 42.

If the next address of the frame in view is 2 and the number generator 46 has stored a 4 in the register 42, the system will proceed in the manner already described to drive the film in the direction indicated by the A code to the fourth frame whose present address is 2 and then stop the film.

The embodiment of the system described above is but one way in which it may be implemented. Many other alternatives are possible. For example, rather than employing the stages 40, 42, 44, one may instead insert a number into counter 40 and employ a full count detector for producing the stop motor signal. For example, if when the machine is in the answer mode the answer button depressed is 4, a count of $3=011$ may be inserted into counter 40 and an AND gate may be employed to sense when the counter is full, that is, when it has reached a count of $7=111$ to stop the motor. Note here that $7-3=4$ which is equal to the number on the answer button which was depressed.

While not illustrated explicitly, it is to be understood that means are provided in the system for resetting the counters and the flip-flop 64 during appropriate places in the operating cycle. The reset commands may be contained in the D and other codes and may be translated to required reset signals by the logic stages 48 and 52 and applied to the stages it is desired to reset. Circuits of this type for performing this and the other housekeeping functions desired, are well known and need not be illustrated separately.

It is also to be understood that, in practice, the machine discussed above can perform numerous other functions. For example, the coding can be such that the proceed button electronically is controlled for causing the film automatically to advance through a course of instruction without operator intervention. The coding may include means for automatically changing the frame either if the answer has not been given within a certain time or for the purpose of teaching courses such as speed reading or aircraft identification. These and many other features not of direct interest in the invention claimed are not illustrated.

What is claimed is:

1. In a machine which includes a film at least some of the frames of which include a next address code which is equal to the present address code on $n$ other frames, where $n$ is an integer greater than one, in combination:
   drive means for said film;
   a viewing screen;
   means responsive to manual actuation for producing a number $p$ not larger than $n$ and for actuating said drive means for causing the latter to drive said film past said viewing screen;
   counting means for counting the answer frames which move past the viewing screen whose present address is equal to the next address on the frame originally in view; and
   means responsive to the counting means and to said number for stopping the film at the $p$'th answer frame whose present address is equal to the next address on the frame originally in view.

2. In a machine as set forth in claim 1, said means responsive to manual actuation comprising a plurality of answer buttons, each for a different number.

3. In a machine which includes a film at least some frames of which are question frames which include multiple choice questions which can be answered by a user by actuating one of a corresponding number of answer buttons and in which the question frames include a next address code which is equal to the present address code on up to as many answer frames as there are questions, in combination;
   a viewing screen;
   means responsive to the actuation by a user of an answer button for driving the film past the viewing screen;
   counting means for counting the answer frames which move past the viewing screen whose present address is equal to the next address on the question frame; and
   means responsive to the counting means and to the answer button actuated by a user for stopping the film at the one of the answer frames whose present address is equal to the next address on the question frame, which is called for by that answer button.

4. In a machine as set forth in claim 3, said last-named means including means for comparing a number produced in response to the actuation of an answer button with the count produced by the counting means.

* * * * *